Figure 1:
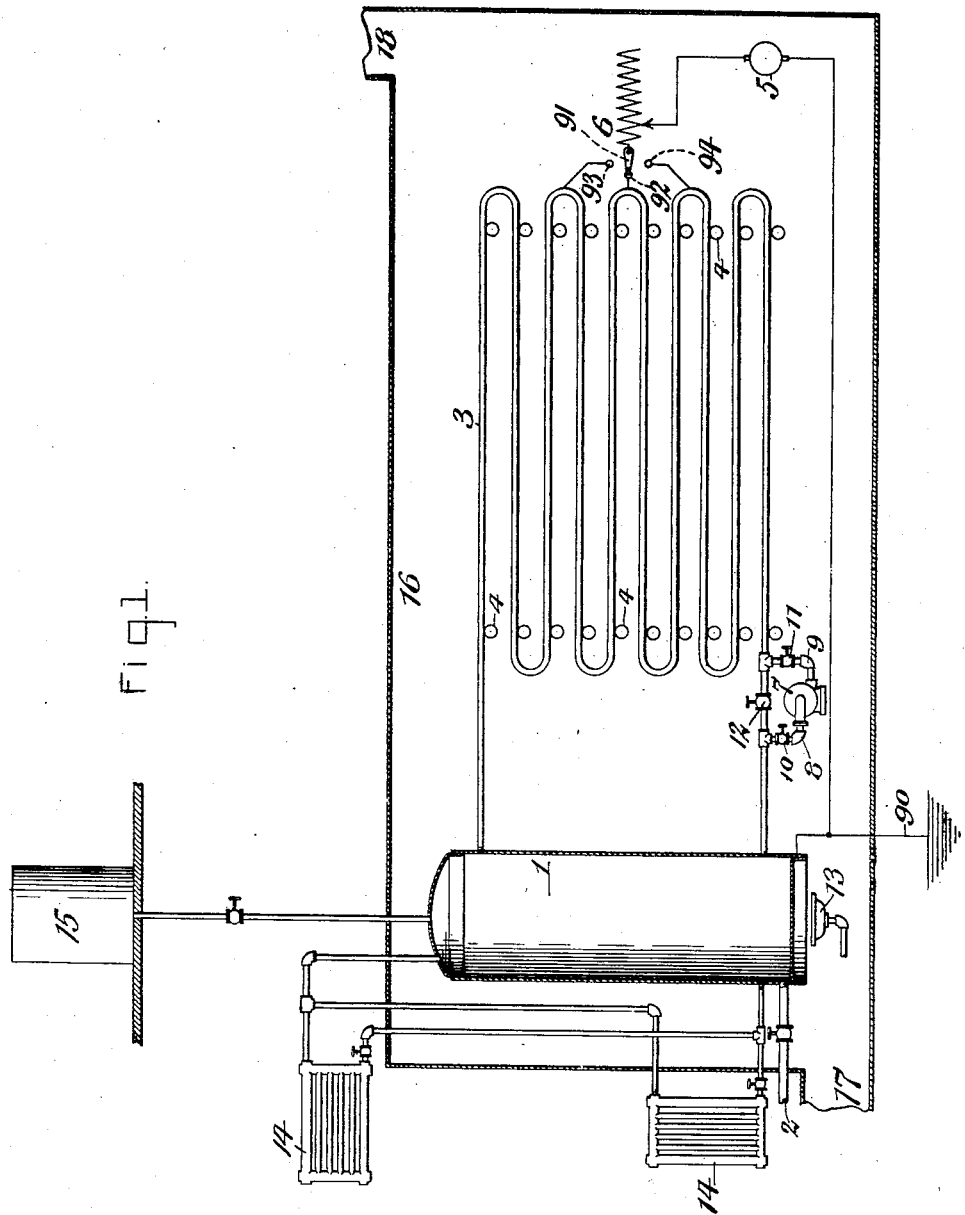

F. C. PERKINS.
WATER HEATING APPARATUS.
APPLICATION FILED MAY 10, 1915.

1,175,470.

Patented Mar. 14, 1916.
2 SHEETS—SHEET 1.

INVENTOR
Frank C. Perkins
by Geyer & Polk
ATTORNEYS.

F. C. PERKINS.
WATER HEATING APPARATUS.
APPLICATION FILED MAY 10, 1915.
1,175,470.
Patented Mar. 14, 1916.
2 SHEETS—SHEET 2.
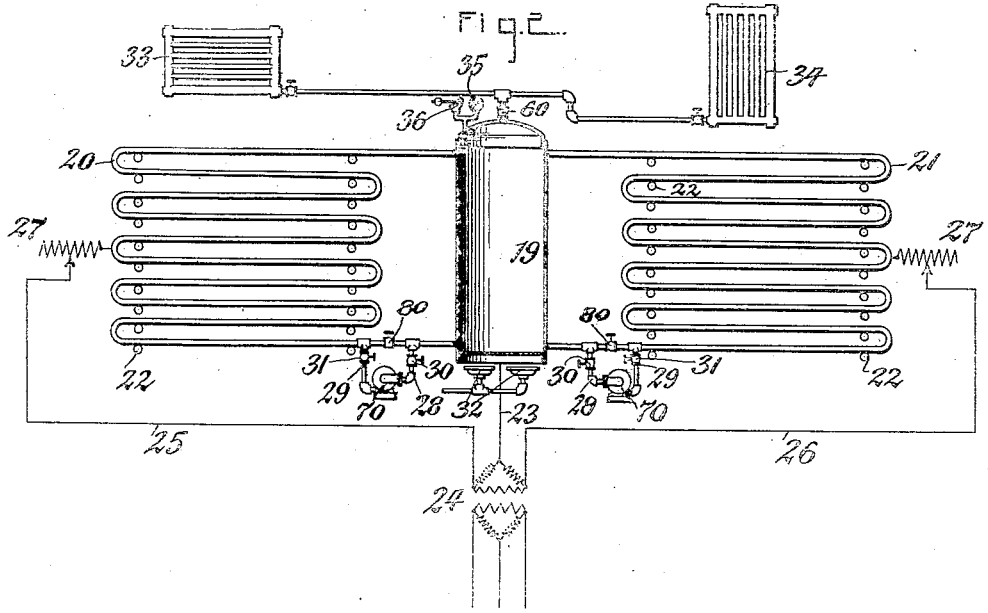
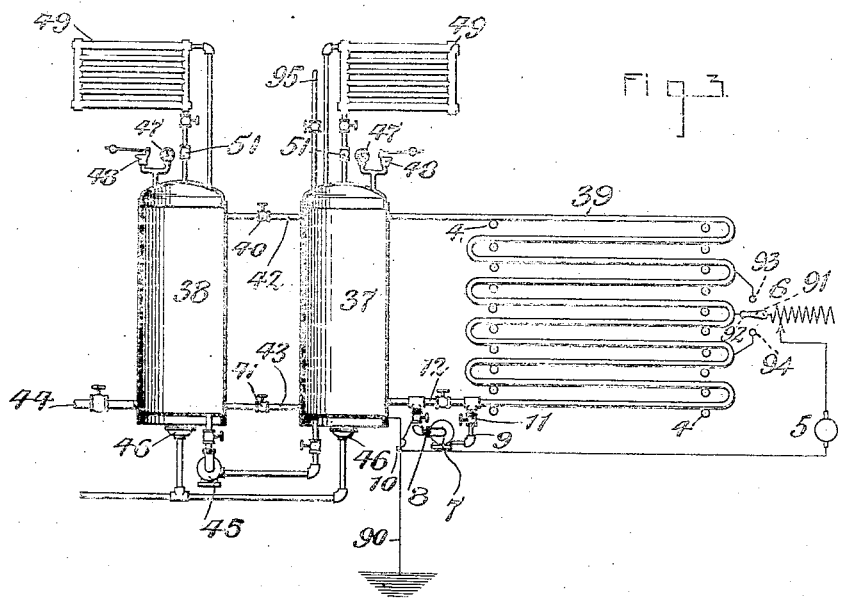
INVENTOR
Frank C. Perkins
BY Geiger & Popp
ATTORNEYS.

UNITED STATES PATENT OFFICE.

FRANK C. PERKINS, OF BUFFALO, NEW YORK, ASSIGNOR OF ONE-EIGHTH TO GEORGE J. MEYER, ONE-EIGHTH TO GEORGE H. MEYER, ONE-EIGHTH TO LEO P. MEYER, AND ONE-EIGHTH TO EUGENE MEYER, ALL OF BUFFALO, NEW YORK.

WATER-HEATING APPARATUS.

1,175,470.  Specification of Letters Patent.  Patented Mar. 14, 1916.

Application filed May 10, 1915. Serial No. 26,969.

*To all whom it may concern:*

Be it known that I, FRANK C. PERKINS, a citizen of the United States, residing at Buffalo, in the county of Erie and State of New York, have invented new and useful Improvements in Water-Heating Apparatus, of which the following is a specification.

This invention relates to an electrical water heating apparatus which may be utilized either as the sole means for heating water in a tank or in conjunction with a fuel burning heater.

It is well known that the minimum demand for electric current is between midnight and sunrise and for this reason the output of an electric generating plant can usually be obtained at less cost at this time than during the other hours of the day.

The object of this invention is to provide simple, efficient and inexpensive means for heating water by electricity and utilizing the same economically.

In the accompanying drawings: Figure 1 is a sectional elevation of a water heating apparatus embodying one form of my invention. Figs. 2 and 3 are similar views showing modifications of my invention.

Similar characters of reference indicate corresponding parts throughout the several views.

Referring to Fig. 1, 1 represents a water tank or boiler which may be constructed of metal in any suitable form and originally supplied by water through a valved pipe 2 connected with the lower end of the tank or otherwise.

3 represents a water pipe coil of metal which may be constructed in the form of a plurality of loops arranged in a vertical tier or row and supported on electric insulators 4, the upper end of this coil being connected with the tank so as to open into the upper end thereof while the lower end of the coil is connected with the tank so as to communicate with the lower part of the same.

5 represents an electric generator of any suitable character such as dynamo, railway rotary converter or the like which generates a direct current or single phase alternating current of 110 volts, 220 volts, 500 volts or any other voltage. This generator is placed in circuit with the water tank and water coil so that the current put out by this generator heats the water in this coil. In the organization shown in Fig. 1 one side or pole of the electric generator is connected with the tank but if desired this pole and the tank may both be grounded, as shown at 90. The opposite pole of the electric generator is electrically connected with the central part of the water pipe coil or one one side of its central part. In operation the current passes from its positive pole to the water pipe coil at the center thereof or on one side of its center and then divides and passes through this coil toward opposite ends thereof to the tank and then returns from the latter to the other pole of the generator. During this passage of the current through the water pipe coil the latter acts as an electrical resistance which causes the same as well as the water therein to become heated. As the water is heated it rises in the coil and discharges into the upper part of the tank while water of lower temperature passes from the lower part of the tank into the lower part of the coil, thereby producing a circulation of the water through the tank and coil and causing the entire body of the water to become heated at substantially the same temperature.

For the purpose of permitting the amount of current flowing from the generator to the water pipe coils to be regulated as required an adjustable resistance 6 is placed in series in the electric circuit the same being represented in Fig. 1 in the circuit between the generator and the water pipe coil. This adjustable resistance may be of any suitable and well known character now in common use such as cast iron resistance grids, water rheostats or resistance wire.

When it is desired to circulate the water faster than that produced solely by thermal action this may be done by a pump 7 having its inlet and outlet connected by branch pipes 8, 9 with the lower part of the water pipe coil, and providing these branch pipes with valves 10, 11, respectively and also providing the coil between the branch pipes with a valve 12. When the pump is not in use the valve 12 is opened and the valves 10 and 11 closed but when the pump is in operation the valve 12 is closed and the valves 10 and 11 are opened.

While the water in the tank and coil is being heated by electricity the effect of the latter may be supplemented by an auxiliary heater which burns coal, gas or other fuel. As an example of such a fuel burning heater a gas burner 13 is represented in Fig. 1 underneath the water tank. This burner may be used either in conjunction with the electric generator or independently thereof during such hours of the day when the demand for electricity is greater and the cost correspondingly higher.

The water may be heated to any desired temperature according to the use to which the same is to be put. For instance in the organization shown in Fig. 1 the water is utilized for heating a building by means of hot water this being effected by connecting the inlets of one or more radiators 14 with the upper part of the water tank and the outlets of the same with the lower part of the tank, and connecting the top of the water heating tank with an overhead or elevated expansion tank 15 in the usual and well known manner of hot water heating systems.

In order to conserve the heat radiated from the exterior of the water heating tank and the water pipe coil these members may be inclosed in a casing or chamber 16 having a lower inlet 17 at one end for the admission of fresh air and an upper outlet 18 at its opposite end through which the air heated by contact with the water tank and coil may be discharged to any suitable place for use.

When the water tank and coil are not arranged in an air chamber in the manner just described and it is not desired to radiate any heat from these members the same may be covered with jackets of heat insulating material in the usual manner.

In Fig. 2 my invention is shown embodied in a steam generating and heating system and in connection with a three wire electric circuit for use with a direct current or a two phase or three phase alternating system. In this construction the water tank or boiler 19 of the steam generator is connected with its upper part to the upper ends of two water heating pipe coils 20, 21 of metal mounted on insulators 22, the lower ends of the coils being connected with the lower part of the tank 19.

The current of electricity is conducted by one line or wire 23 from a three phase electric transformer 24 to the boiler 19 and by two other lines or wires 25, 26 with the central parts, respectively, of the two coils 20, 21, an adjustable resistance 27 being also preferably arranged in series in each of the last mentioned lines. The current passing from the transformer through each of these coils heats the water therein in the same manner previously described and the water in the coils and the boiler may either circulate by thermal action or this circulation may be accelerated by connecting the inlet 28 and outlet 29 of a pump 70 with the lower part of each coil, said inlet and outlet being provided respectively with valves 30, 31, and a valve 80 being arranged in the coil between the inlet and outlet of the companion pump. A gas burner 32 or other fuel burning heater arranged under the boiler or tank 19 may also be used either solely for heating the water when the current is cut off, for instance, during the high rate hours, or this burner may be used as an auxiliary to the electric current whenever it is desirable to do this. The steam thus generated may be used for any desired purpose, for instance to heat a building by connecting the upper part of the boiler 19 with radiators 33, 34 by piping containing a reducing valve 60, as shown in Fig. 2. In case of emergency this steam may also be used for operating a steam driven turbine which operates an electric generator which, during the peak of load on line from the transformer is supplied, permits the water heating coils to be supplied for a short time by electricity generated by power derived from the heat energy stored in the boiler 19 and thus serve as an auxiliary to the fuel burning heater during such peak load. In case of a steam installation the boiler is preferably provided with the usual pressure gage 35 and safety valve 36.

In the application of my invention shown in Fig. 3 two steam boilers or tanks 37, 38 are used one of which, 37, may either be used alone in connection with a water pipe coil 39 which is electrically heated in the manner shown in Fig. 1 or the same may be used jointly with the other tank 38 by closing or opening valves 40, 41 arranged in pipes 42, 43 connecting the upper and lower parts of these tanks. Raw water may be supplied to both tanks by a valve pipe 44 connecting with the tank 38 and the water may be maintained at substantially the same temperature by a pump 45 having a valved inlet through which water is withdrawn from the tank 38 and a valved outlet through which the water is discharged into the tank 37.

By cutting out the tank 38 the heating of the water may be confined to the tank 37 and thereby effect a saving in heat when the circumstances do not require heating of both tanks. As shown in Fig. 3 each tank is provided with an auxiliary fuel burning heater 46, a pressure gage 47 and a safety valve 48 and each tank is connected with a radiator 49 by piping containing a reducing valve 51. Steam may also be conducted through a valved pipe 95 from the boiler 37 to a steam turbine or engine for developing power or for any other purpose.

As shown in Figs. 1 and 3, a switch is provided whereby the current of electricity flowing through the water pipe coil may either be distributed equally between the upper and lower parts of this coil or the lower part may be heated more than the upper part or the upper part may be heated more than the lower part. The switch suitable for this purpose shown in Fig. 1 comprises a movable contact 91 electrically connected with the dynamo and adapted to engage with one or the other of a plurality of fixed contacts 92, 93, 94 connected respectively with the central part of the water pipe coil, with a part above its center and a part below its center.

When the movable contact 91 engages the central fixed contact 92 the current of electricity is equally divided between the upper and lower halves of the water pipe coil and the entire coil is heated uniformly. But when the movable contact is engaged with the upper fixed contact 93 the resistance of the upper part of the coil is decreased and the lower part thereof increased, whereby the water in the upper part will be heated to a higher initial temperature than that in the lower part of the coil, and vice versa when the movable contact is engaged with the lower contact 94. This switch therefore permits of regulating the heating of the water in the coils as desired and in case of a steam boiler it permits of superheating the steam in the upper part of the coils when this is desired.

In the several installations above described the heat stored in the hot water at night by electricity may be utilized during the day, it being possible to cut off almost the entire current during the daytime, only so much being utilized as will provide a circulation of the water.

My invention furnishes a cheap and effective system of heating water electrically for use in hot water heating, low pressure steam heating or for producing high pressure steam for operating steam engines or turbines, and also for maintaining a constant steam pressure electrically in a boiler plant as an auxiliary to the coal or other fuel burner, without necessitating the use of fuel at such hours of the night when the electric current is available at a low rate of cost on account of the reduced demand for the same at certain periods of the day.

I claim as my invention:

1. A metal water heating apparatus comprising a water pipe coil, a metal tank with which the ends of said pipe are connected, a source of electric energy, and means for connecting said source of energy with said tank and with different parts of said coil between the ends thereof.

2. A metal water heating apparatus comprising a water tank forming a section of an electric conducting circuit, a metal water and electric current conducting pipe coil having upper and lower ends connected respectively with the upper and lower ends of the tank, and means for supplying an electric current having one pole connected with said water pipe coil between the ends thereof and the other pole electrically connected with the water tank.

3. A metal water heating apparatus comprising a water tank forming a section of an electric conducting circuit, a metal water and electric current conducting pipe coil having upper and lower ends connected respectively with the upper and lower ends of the tank, means for supplying an electric current having one pole connected with said water pipe coil between the ends thereof and the other pole electrically connected with the water tank, and an adjustable electrical resistance arranged in said circuit.

4. A metal water heating apparatus comprising a water tank forming a section of an electric conducting circuit, a metal water and electric current conducting pipe coil having upper and lower ends connected respectively with the upper and lower ends of the tank, means for supplying an electric current having one pole connected with said water pipe coil between the ends thereof and the other pole electrically connected with the water tank, and means for forcibly circulating the water in said tank and coil.

5. A water heating apparatus comprising a water tank, a metal water pipe coil having upper and lower ends connected respectively with the upper and lower ends of the tank, means for supplying an electric current having one pole connected with said water pipe coil between the ends thereof and the other pole electrically connected with the water tank, and an air chamber inclosing said tank and coil and having a lower air inlet and an upper air outlet.

FRANK C. PERKINS.